Patented Oct. 9, 1945

2,386,334

UNITED STATES PATENT OFFICE 2,386,334

PROCESS FOR THE SEPARATION OF HYDROCARBONS

Lloyd C. Morris, Bartlesville, Okla., assignor to Phillips Petroleum Company, a corporation of Delaware No Drawing. Application April 6, 1942, Serial No. 437,902

11 Claims. (Cl. 260—666)

This invention relates to a process for the separation and recovery of hydrocarbons. More specifically, it concerns a chemical process for such separation. It has particular application to the recovery of cyclic olefins from hydrocarbon mixtures, and the separation and recovery of cyclic olefins and aliphatic diolefins from admixture with each other and from admixture with other hydrocarbons.

In the thermal conversion of hydrocarbons, and particularly in low-pressure cracking of the lower boiling paraffins, there are produced mixtures of olefins, diolefins, aromatics, and naphthenes, together with a small amount of residual paraffins. Fractionation of these cracking furnace products results in separation into portions consisting substantially of hydrocarbons having the same number of carbon atoms per molecule. Closer fractionation produces portions with very narrow boiling ranges, but often with still complex compositions. In many cases, formation of azeotropic or constant boiling mixtures makes separation and recovery of the pure components of hydrocarbon mixtures by conventional fractionation impossible. Often, however, such separation and recovery of pure components is desirable. Azeotropic distillation using various organic and inorganic substances as entraining agents has been used, but such methods are expensive because of inherent high equipment and operating costs. The separation is usually complex even with the added material and losses of entraining liquid are often inevitable. Quite frequently, removal of the last trace of entraining liquid from the purified hydrocarbons is extremely difficult, and the presence of this impurity in the finished product is often highly undesirable. However, a chemical separation process frequently has very distinct advantages without having the disadvantages mentioned above.

An object of this invention is to provide a process for the separation of hydrocarbons through reaction with metal salts to form complexes with unsaturated hydrocarbons. Another object is to provide for the separation and recovery of cyclic olefins from hydrocarbon mixtures containing the same. A further object is to provide for the segregation of cyclic olefins and aliphatic conjugated diolefins through differences in their reactivity with cuprous halides. Another object is to provide a chemical process for separation of the components of hydrocarbon mixtures consisting of compounds of such closely adjacent boiling points that practical separation by fractional distillation is difficult or impossible.

Yet another object is to provide a process for the manufacture of cyclo-olefin concentrates for use in synthetic chemistry, for motor-fuel blending stocks, and the like. Other objects will be apparent from the following description.

It is known in the art that aliphatic olefins react with certain metal salts, particularly salts of the heavy metals of groups I and II of the periodic system, to form more or less unstable complex compounds which can be isolated and decomposed to recover the hydrocarbon. It has been reported that with cuprous halides, said aliphatic olefins form compounds soluble in aqueous salt solutions in which they may be formed, while aliphatic diolefins such as the butadiene hydrocarbons, in the same circumstances, form insoluble compounds. I have now discovered, as described in my co-pending application, Serial No. 437,903, filed of even date herewith, that cyclic olefins also form cuprous halide complexes, and that these complexes are insoluble both in hydrocarbon liquids and cuprous halide solutions; and I have further discovered that the cyclic olefin complex forms even more readily than the aliphatic diolefin complex. Making use of these facts, I have devised a process whereby cyclic olefins may be separated and recovered from hydrocarbon mixtures, even when aliphatic diolefins are also present.

One specific embodiment of this invention comprises intimately mixing a hydrocarbon mixture containing cyclic olefins with an aqueous cuprous chloride reagent to produce an insoluble cuprous chloride-cyclic olefin complex. The aqueous layer and the unreacted hydrocarbon are then separated from the solid product and the latter is decomposed by gentle heating to recover the cyclic olefin.

When aliphatic diolefins are present in the hydrocarbon mixtures to be treated, the process includes an additional feature which is of great importance to the successful application of the invention. Since said diolefins also form insoluble cuprous halide complexes, it is necessary to make use of the newly discovered, more rapid reaction rate of cyclic olefins. I employ a technique of fractional formation and precipitation of the cuprous halide complexes in order to separate cyclic olefins and aliphatic diolefins and/or to obtain cyclic olefin and aliphatic diolefin concentrates of any desired purity.

This fractional precipitation is accomplished by reacting the hydrocarbon mixture in a series of contacting steps or zones with successive portions of cuprous halide reagent, whereby only a pre-determined fraction of the reactive hydrocarbons forming insoluble complexes is reacted with cuprous halide in each step. Usually this is accomplished by limiting the amount of cuprous salt in each portion of reagent and allowing substantially complete reaction of the cuprous salt to form complexes. However, similar results may be obtained by limiting the reaction time so that only part of the insoluble complex compounds obtainable from the hydrocarbon mixture are precipitated out in each step, even though an excess of cuprous halide may remain in the reagent. Generally, the most satisfactory separation is had when less than equivalent quantities of cuprous halide are present in each treating step. Even in such cases, economic consideration will decide whether to react all or only part of the halide. The complex precipitated by each of these partial reactions is segregated and decomposed separately and cyclic olefins and aliphatic diolefins may be recovered in suitably pure form from separate batches of the fractionally precipitated complex.

The extent to which the fractional precipitation must be carried out in order to recover cyclic olefins more or less completely will depend on the relative concentrations of cyclic olefins and aliphatic diolefins in the original mixture, as well as on the fraction of reactive hydrocarbons which is accounted for in each of the successive treatments. By employing a large number of portions of cuprous halide reagent containing small proportions of the reactive salt, it is possible to obtain a high degree of separation and an essentially pure cyclic olefin product. However, in dealing with many hydrocarbon mixtures, from one to about four fractional precipitations, with each accounting for a proportionate part of the cyclic olefin content, often produce a satisfactory separation. It has been noted that when using a number of precipitations the cyclic olefin complex, under suitable reaction conditions, will be substantially pure in the first and second portions of precipitate and will be highly concentrated in some of the following portions. Any hydrocarbon mixtures of lower cyclic olefin content recovered by the later steps of the fractional precipitation procedure may be utilized elsewhere or may be returned for further cyclic olefin recovery if desired.

The form of the metal salt reagent used for accomplishing the desired separation is preferably an aqueous solution. However, the salt may be in solid form, and may be dispersed and/or adsorbed on the surface of various solid dispersing agents or carriers. These latter materials may include bauxite, fuller's earth, asbestos, and the like. Furthermore, the solid salt may be used as a slurry in various hydrocarbon-immiscible liquids such as water. Or solutions of cuprous halide in certain olefinic liquids may be employed.

The suitable aqueous cuprous halide solutions may be prepared with various solutizing agents such as alkali or alkaline earth metal chlorides, ammonia, and others familiar in the art for preparing this type of solution. These solutions may be acid, alkaline or neutral. Undissolved cuprous halide, in excess of its solubility in the various solutions, may be present in suspended form if desired, although use of a clear solution is usually preferable. Minor proportions of a reducing agent such as sodium bisulfite, hydroxylamine hydrochloride, etc. may be used to advantage to prevent oxidation of the cuprous halide.

When using aqueous solutions, the formation of the complexes is satisfactorily accomplished by the solutions just described. However, I have found that greatly improved results may be obtained, especially in the fractional precipitation of cyclic olefins and aliphatic diolefins, through the use of cuprous halides dissolved in strongly acidified solutions containing non-oxidizing mineral acids. By employing the cuprous halide in strongly acid solution instead of in a more nearly neutral solution, it is possible to obtain cyclic olefin concentrates of higher purity by a given number of steps, and/or to segregate larger fractions of the original cyclic olefin content in fewer steps without thereby including large amounts of aliphatic diolefins and reducing the purity of the recovered cyclic olefins. These advantages are apparently due to the greater selectivity of the acidic reagent for cyclic olefin complex formation and are reflected in increased efficiency of the fractional precipitation procedure. In all cases the acidic cuprous halide reagent solutions contain added mineral acid and thus have a distinctly higher acidity than non-acidified solutions of cuprous halides and salts such as ammonium chloride. These latter salt solutions may have a pH somewhat on the acid side due to the buffering action of the ammonium chloride, but not usually below about 3 (or 0.001 normal).

For making the separation between cyclic olefin and aliphatic diolefin complexes, I prefer to use a clear solution prepared by saturating a moderately concentrated non-oxidizing strong mineral acid solution with cuprous chloride or cuprous bromide. Hydrochloric or hydrobromic acid in the concentration range of from one or less to about ten normal has proved satisfactory with two to four normal being a very convenient concentration. The selectivity of the reagent for cyclic olefin complex formation appears to increase with increasing acid concentration from about 0.1 normal up to a point in the range of four to eight normal. Above this range little benefit is derived from higher acid concentrations although solutions of 10 normal hydrochloric acid have been employed. A preferred acid concentration for the non-oxidizing mineral acids as used in aqueous solutions of cuprous halides for this invention is from about 2 to about 8 normal.

A minor proportion of a suitable organic or inorganic reducing agent such as sodium bisulfite or hydroxylamine hydrochloride may be added to the cuprous halide solution, if desired, although the value of this is less in strongly acid solution than in those more nearly neutral. Cuprous halides are much more resistant to oxidation in acid solutions, which is a further advantage in the use of acidic solutions.

Other reagent compositions which comply with the requirements of the present invention may be prepared from other non-oxidizing strong mineral acids such as sulfuric and phosphoric. These acids are used in dilute solutions of such strength that no side reactions with the hydrocarbons occur, and usually with fairly high concentrations of a soluble alkali metal or ammonium halide in solution. For example, reagent solutions may be prepared by dissolving cuprous chloride or bromide in a water solution containing the corresponding sodium or ammonium halide as a solutizer, and dilute acid added thereto in amounts sufficient to produce the concentrations noted above. A very satisfactory method of preparing cuprous bromide reagents comprises the addition of sulfuric or phosphoric acid solution to a solution of cuprous bromide and sodium bromide. The use of concentrated sulfuric acid, even in preparation of the reagent solutions is avoided because of the oxidizing power of the undiluted acid.

The cyclic olefins react rapidly and completely with both cuprous chloride and cuprous bromide to form the corresponding insoluble complexes, so that either halide may be used in the preparation of the various types of reagents for the present invention. I have noted that in the treatment of hydrocarbon mixtures containing both cyclic olefins and aliphatic diolefins, the reaction of the latter with cuprous bromide to precipitate the complex is somewhat less rapid than with cuprous chloride. However, the rate of reaction of the cyclic olefins, particularly with acid solutions, is not affected to any such extent. Accordingly, the separation of cyclic olefins in concentrated or substantially pure form by fractional precipitation, especially in cases involving favorable concentration ratios of cyclic olefins to aliphatic diolefins, may sometimes be accomplished with cuprous bromide reagents more readily than with cuprous chloride reagents, thus permitting simplification of the precipitation procedure and/or effecting the precipitation more rapidly or in fewer steps.

From the standpoint of cost, availability, and stability, cuprous chloride is the preferred reagent. Therefore, a choice of a cuprous halide will be made by an evaluation of the relative advantages and disadvantages of each in treating any particular hydrocarbon mixture.

Not only may cyclic olefins, and aliphatic diolefins if present, be segregated from hydrocarbon mixtures as described, but a further separation into hydrocarbon types may be made when aliphatic olefins are also present, by use of aqueous cuprous halide reagents as described in my co-pending application, Serial No. 437,904, filed of even date herewith. Thus, as explained therein, a hydrocarbon mixture comprising cyclic olefins, aliphatic olefins, and one or more paraffins, naphthenes, and/or aromatics, and which also may include aliphatic diolefins, may be separated into (1) cyclic olefins and (2) aliphatic diolefins if present, by the processes herein described, and furthermore into (3) aliphatic olefins and (4) paraffins, naphthenes, and/or aromatics. The latter separations are accomplished by solution of the aliphatic olefins in the aqueous cuprous halide reagent in the form of soluble complexes which may be decomposed by heating and reduction of pressure to liberate aliphatic olefins; paraffins, naphthenes, and/or aromatics are recovered unreacted.

The precipitation reaction is best carried out at moderately reduced temperatures below about 80° F. A satisfactory temperature range when using aqueous solutions is from about 30 to about 80° F., with a preferred temperature range of from 30 to 45° F. The reaction between the hydrocarbon and cuprous halide takes place rapidly, but sufficient mixing should be provided to produce complete reaction. Suitable contact and reaction time may be obtained by such mixing devices as centrifugal contactors, motor-driven stirrers, jet or baffle mixers and the like with concurrent or countercurrent flow of reactants. It is desirable to maintain a degree of emulsification between the aqueous and hydrocarbon phases, and to settle and separate the phases after an adequate reaction period. In such instances, it is preferred to maintain the hydrocarbons in liquid phase to increase the contact time at given treating rates. Contact time of from about one minute to one hour or more have been satisfactorily used, with the time necessary for sufficient contacting being governed chiefly by the efficiency of the mixing devices used. It is also possible to conduct the reaction with the hydrocarbon in vapor phase by blending with non-condensable diluents and providing for suitable contact between hydrocarbon vapors and the reagent.

The unreacted hydrocarbons and the aqueous solution are separated from the solid metal salt reaction products by any suitable means, with the completeness of separation depending on the desired purity of the recovered hydrocarbon concentrates. Such means include decantation, filtration, centrifuging, and the like, and the main body of aqueous reagent solution after being substantially freed of retained hydrocarbons may be recombined with the solid precipitate prior to desorption of the chemically-combined hydrocarbons. A preferred procedure is to separate the solid reaction products and to wash them with butane or other suitable low-boiling paraffinic hydrocarbon to remove occluded but unreacted hydrocarbons. This washing operation is performed under pressure and at temperatures below those causing any decomposition of the precipitated complexes.

When solid-type reagents are used, the hydrocarbon mixture containing cyclic olefin may be passed over the reagent in either liquid or vapor phase, though preferably the latter. The solid reagent generally serves to retain the insoluble complexes formed and thus separate them from unreacted hydrocarbons.

The cyclic olefin-cuprous halide complexes are decomposed by gentle heating at temperatures above about 125° F. to release the hydrocarbons and leave a residue of cuprous halide. The desorption of the cyclic olefins takes place readily at about 125° F., although higher temperatures up to 200° F. or higher may be used, with or without reduced pressures to expedite the desorption. If desired, a stream of hot non-condensable, non-oxidizing gas may be passed over the complex, and desorbed hydrocarbons recovered by condensation.

The metal salt employed in this process may be re-used repeatedly by recovering the residue from the desorption step and returning it to the reagent. It will be apparent that the methods outlined may be employed in a cyclic process by suitable modifications, or may be used in combination with physical separation processes for concentration of the substances with which this invention is concerned. For example, the hydrocarbon mixtures may be subjected to fractionation to produce narrower boiling range mixtures prior to treatment by the present invention. Or, if desirable, further fractionation by known methods may follow the concentration of cyclic olefins according to my process.

Although the present invention is of general application, it is of particular benefit in the separation and recovery of cyclic olefins from mixtures comprising normally liquid hydrocarbons of five or more carbon atoms. Cyclopentene is usually the lowest boiling member of the cyclic olefins series normally encountered, although cyclobutene falls within the scope of this disclosure as do the alkylated cyclic olefins such as methyl cyclopentene. Cyclopentene and the higher boiling members are ordinarily separated by my process from mixtures of corresponding boiling ranges. It is conventional practice to remove lower boiling compounds such as C₄ and lighter hydrocarbons from mixtures prior to treatment, although this is not always required. Thus, such normally gaseous compounds may be present, or relatively inert gaseous materials may even be added when treatment in vapor phase is performed. In those cases where mixtures of two or more cyclic olefins are recovered, and also where mixtures of two or more diolefins are recovered from the last portions of complex formed by fractional precipitation as described, individual hydrocarbons may subsequently be separated by fractionation.

In order to conserve reagent and make the separation step less complex, it is ordinarily of advantage to remove such compounds as carbon monoxide, acetylene, or low-boiling acetylenic hydrocarbons and cyclic diolefins from hydrocarbon mixtures prior to treatment by the present invention. The first-named compounds are ordinarily separated by simple fractionation, while cyclic diolefins are susceptible to separation by auto or induced polymerization followed by removal of the polymer by fractionation either before or after contact with the reagent, although preferably before.

For purposes of illustration of the principles involved in this invention as well as of specific applications to the treatment of various hydrocarbon mixtures, the following examples are cited.

Example I

A sample of low-boiling aromatic oil obtained by a cracking step had a boiling range of 105–350° F. The sample consisted of aliphatic olefins, cyclic olefins, paraffins, naphthenes, and aromatics. Diolefins and acetylenic hydrocarbons were substantially absent. The sample was intimately mixed with a cuprous chloride solution consisting of 15 parts by weight $NH_4Cl$, 78 parts water, and 7 parts $CuCl$. The reaction mixture was maintained at 40–60° F. until the reaction between cyclic olefins and cuprous chloride was complete. The precipitated complex was separated from the unreacted hydrocarbon and aqueous solution and decomposed by heating to 135° F. The recovered hydrocarbon was 95 per cent cyclic olefin, principally cyclopentene and cyclohexene.

Example II

A sample of aromatic oil obtained from low-pressure cracking of a paraffinic normally gaseous hydrocarbon stock had the following properties: boiling range 105–215° F., mol per cent aliphatic diolefin 22 per cent, total unsaturation 50 per cent. The sample consisted chiefly of cyclopentene, cyclohexene, benzene, toluene, and piperylene. The sample was intimately mixed with a solution consisting of 15 parts by weight of $NH_4Cl$, 78 parts water, and 7 parts $CuCl$. The reaction mixture was maintained at 35–40° F. The hydrocarbon was treated in consecutive steps with four successive portions of the cuprous chloride solution, each portion containing sufficient cuprous chloride to react with approximately one-fourth of the reactive hydrocarbons present in the original hydrocarbon mixture. The precipitate formed with each portion of cuprous chloride was segregated, washed with butane, and decomposed separately to recover the hydrocarbon. Decomposition was accomplished by heating the complex to 200° F. The hydrocarbon from the first portion precipitated was 88 per cent cyclo-olefin, that from the second portion was 76 per cent cyclo-olefin. These two fractions accounted for the major portion of cyclic olefins present in the original mixture. The last of the four portions contained better than 90 per cent aliphatic diolefin.

In a subsequent treatment, a still higher degree of separation and purity of product was obtained by treating the original hydrocarbon mixture in four consecutive steps with four portions of cuprous chloride reagent, each portion containing sufficient cuprous chloride to form a complex with about one-fourth of the total cyclic olefin recovered by the first-described separation. The precipitate from each step was decomposed separately and hydrocarbons from the first three precipitates were combined as a highly pure cyclic olefin concentrate. Contact of the thus-treated hydrocarbon mixture with further portions of cuprous chloride reagent gave pure aliphatic diolefins from the final precipitates.

Example III

A sample of closely fractionated C₅ hydrocarbons obtained from low-pressure cracking of an ethane-propane stock had a boiling range of 106–120° F. On analysis, this sample was found to be 100 per cent unsaturated and to contain 78 per cent of cyclopentene, and 22 per cent piperylene. No cyclopentadiene or acetylenic compounds were present. This sample was maintained at 45° F. while being mixed with four successive portions of a cuprous chloride solution, each portion containing sufficient cuprous chloride to react with approximately one-fourth of the cyclopentene and piperylene present in the original mixture. The precipitate formed with each portion of cuprous chloride was separated and decomposed separately. Decomposition was accomplished by heating the complex to 200° F. The hydrocarbon recovered from the first portion of precipitate was 95 per cent cyclopentene, that from the second portion was over 90 per cent cyclopentene. The hydrocarbon from the third portion of complex contained sufficient cyclopentene to allow its return to the original mixture for further treatment. The hydrocarbon from the last portion of complex was predominately piperylene.

When the same hydrocarbon mixture was treated with an excess of cuprous bromide solution at 45° F. for a reaction time limited to 10 minutes, only cyclopentene was precipitated as the cuprous bromide complex. Cyclopentene free from piperylene was obtained by heating the precipitate above 125° F. and collecting the released hydrocarbon.

Example IV

A C₆ hydrocarbon mixture containing cyclohexene was intimately mixed at a temperature of 40° F. with an aqueous cuprous bromide reagent. The cyclohexene was quantitatively converted to the insoluble complex which was filtered from the reaction mixture and washed free of adsorbed hydrocarbons with butane. The approximate formula of this complex was $C_6H_{10} \cdot Cu_2Br_2$. Substantially pure cyclohexene was recovered by heating the complex to about 140° F.

Example V

A fraction of hydrocarbon liquid boiling between 100 and 200° F. was separated from the effluent from a low pressure thermal cracking unit operating on a charge of mixed ethane and propane. This unsaturated liquid was intimately contacted at 40° F. by means of a turbo-mixer with four successive portions of a clear solution of cuprous chloride, consisting of seven normal hydrochloric acid saturated with cuprous chloride, each portion of which solution contained sufficient cuprous chloride to react with 30 per cent of the cyclic olefin present in the original hydrocarbon mixture. The solid complex formed with each portion of solution was segregated and decomposed separately.

The cyclic olefin regenerated from the first two precipitates contained over 90 per cent of cyclic olefins and was combined and fractionated into two portions one consisting essentially of cyclopentene and the other of cyclohexene. The precipitates obtained with the third and fourth portions of solution were decomposed and yielded a predominately aliphatic diolefinic hydrocarbon mixture containing only minor proportions of cyclic olefins. When a solution of cuprous chloride in ammonium chloride and ammonium hydroxide was utilized in a similar operation only the first of four fractions contained a suitable concentration of cyclic olefins.

*Example VI*

A closely fractionated portion of unsaturated hydrocarbon liquid with a boiling range of 105-120° F. was intimately mixed at 40° F. with three successive portions of a reagent solution prepared by the addition of sufficient dilute sulfuric acid to a saturated cuprous bromide-sodium bromide solution to result in a three normal acid concentration. Each portion of the reagent used contained sufficient cuprous bromide to react with approximately 40 per cent of the cyclopentene in the original oil. Analysis indicated that the hydrocarbon liquid being treated was 82 per cent cyclopentene and 18 per cent piperylene. Contact time was such that most, though not all, of the cuprous bromide in each portion of reagent solution was used up in forming the complex. The precipitate formed from each portion of the solution was segregated, washed with butane under 50 pounds gage pressure at 35° F., then decomposed by heating for one hour at 200° F. The hydrocarbon recovered from the first portion of precipitate was 98 per cent cyclopentene, that from the second 92 per cent, and from the third 85 per cent.

When this operation was repeated under the same conditions with a nearly neutral solution of cuprous bromide in sodium bromide solution, the hydrocarbon recovered from three fractions of precipitated complex contained 92, 82 and 70 per cent of cyclopentene respectively.

It will be obvious to those skilled in the art, in view of this disclosure, that variations other than those specifically mentioned above may be made, such as in the number of treating steps, in concentration and composition of the cuprous halide reagents used, etc., without departing from the scope of this invention as defined in the appended claims.

The term "cyclic olefin" is used herein and in the appended claims in its usual meaning, as understood by those skilled in the art, to denote the cyclic mono-olefins typified by cyclohexene, cyclopentene, etc.

I claim:

1. A process for the separation of cyclic olefins and aliphatic diolefins from a hydrocarbon mixture containing the same which comprises contacting said mixture with a portion of a cuprous halide reagent containing only a fraction of the cuprous halide required to react with all of said cyclic olefins and aliphatic diolefins, separating the insoluble cuprous halide-hydrocarbon complex thus formed, and carrying out the contacting and separating steps a plurality of times to first separate out the cyclic olefins and then the aliphatic diolefins.

2. A process for the separation of cyclic olefins from a hydrocarbon mixture containing the same along with aliphatic diolefins which comprises fractionally precipitating cuprous halide complex compounds from said mixture by treatment in a series of consecutive steps to precipitate in each step only a pre-determined fraction of the insoluble complexes obtainable from said mixture, separating the fraction of precipitated complex produced by each treating step, decomposing same to release the corresponding hydrocarbon fraction, and recovering a hydrocarbon fraction containing predominantly cyclic olefins from at least one of the consecutively obtained fractions of cuprous halide complex.

3. A process for the separation of aliphatic diolefins substantially free from cyclic olefins in admixture therewith which comprises contacting a hydrocarbon mixture containing said aliphatic diolefins and cyclic olefins with successive portions of cuprous halide reagent so as to precipitate with each portion only a fraction of the cyclic olefin content of said mixture as the insoluble cuprous halide-cyclic olefin complex, continuing said contacting until substantially all of said cyclic olefins are removed from said mixture without complete removal of said aliphatic diolefins, and thereby recovering aliphatic diolefins substantially free from cyclic olefins.

4. A process for the segregation of cyclopentene and piperylene from a hydrocarbon mixture containing the same which comprises fractionally precipitating insoluble cuprous halide-hydrocarbon complex compounds by contacting said mixture at temperatures below about 80° F. with a cuprous halide reagent a plurality of times so as to precipitate only a part of said complexes each time, recovering cyclopentene by decomposition of the first portions of said complex compounds precipitated, and recovering piperylene by decomposition of the last portions of said complex compounds precipitated.

5. In a process for the separation of cyclic olefins and aliphatic diolefins from hydrocarbon mixtures through formation of insoluble cuprous chloride-hydrocarbon complexes, the step of fractionally precipitating said complexes to effect at least partial segregation of cyclic olefins from aliphatic diolefins.

6. A process which comprises recovering cyclic olefins free from aliphatic diolefins by intimately contacting a hydrocarbon mixture containing said cyclic olefins and aliphatic diolefins with an aqueous cuprous bromide reagent so as to precipitate the cyclic olefin-cuprous bromide complex without any substantial precipitation of aliphatic diolefin-cuprous bromide complex, and recovering cyclic olefins from the precipitated complex.

7. A process for the separation of cyclic olefins and aliphatic diolefins from a hydrocarbon mixture containing the same which comprises fractionally precipitating cuprous halide complex compounds from said mixture by treatment in a series of consecutive steps with portions of cuprous halide reagents comprising a cuprous halide in an aqueous non-oxidizing mineral acid solution, wherein each of said portions contains sufficient cuprous halide to precipitate a pre-determined fraction of the insoluble complexes obtainable from said hydrocarbon mixture, separating the fractions of precipitated complex produced by each treating step, and decomposing the same to release the corresponding hydrocarbon fractions.

8. A process according to claim 7 in which the acid is hydrochloric acid.

9. A process according to claim 7 in which the aqueous cuprous halide reagent solution comprises a cuprous halide, an alkali metal halide, and a non-oxidizing mineral acid.

10. The process of recovering a cyclic olefin in concentrated form from a hydrocarbon mixture containing the same and other close-boiling hydrocarbons which comprises intimately contacting said mixture at temperatures below about 80° F., with a cuprous halide-containing reagent and thereby forming a complex of the cuprous halide and the cyclic olefin contained in said mixture, said complex being insoluble in hydrocarbons and in aqueous cuprous halide solutions, separating said insoluble complex from unreacted hydrocarbon and from any aqueous solution present, and recovering concentrated cyclic olefin by heating said separated complex at a temperature above 125° F.

11. The process of claim 10 wherein said reagent is in the form of an aqueous solution of the cuprous halide and a non-oxidizing strong mineral acid, said acid being present in a concentration of from about 2 to about 8 normal, the presence of said acid increasing the selectivity of said reagent for the cyclic olefin.

LLOYD C. MORRIS.